Dec. 13, 1927. 1,652,648
E. V. SWANGREN
SOFT METAL WASHER FOR NAILS
Filed Feb. 26, 1927
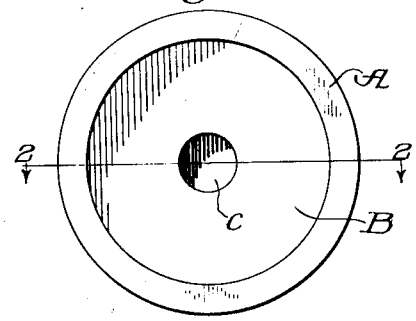
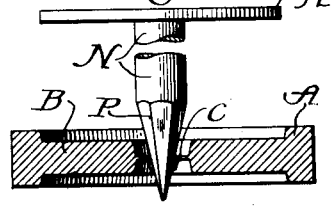
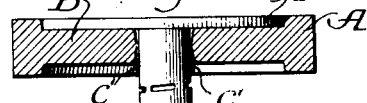
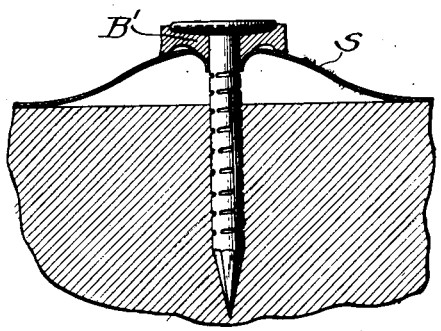
Inventor
Edwin V. Swangren
By Fisher, Towle, Clapp & Soans
Attys Patented Dec. 13, 1927.

1,652,648

UNITED STATES PATENT OFFICE.

EDWIN V. SWANGREN, OF MAYWOOD, ILLINOIS, ASSIGNOR TO ALBERT J. DENISTON, JR., OF CHICAGO, ILLINOIS.

SOFT-METAL WASHER FOR NAILS.

Application filed February 26, 1927. Serial No. 171,086.

In attaching sheet-metal sheathing to the roofs and walls of buildings it is common practice to employ wire nails equipped with lead washers for the purpose of sealing the nail hole in the sheathing around the head and neck of the nail against the ingress of moisture. In some instances plain lead washers centrally apertured for the passage of the body of the nail therethrough are employed, but this requires the stringing of the washers on the nails before the latter are driven, involving extra time and trouble to the workman, as compared with the driving of plain nails. In other instances so-called lead-headed nails are used, these being nails wherein a lead washer has been permanently applied to the head and neck of the nail either by casting or by die pressure. This saves the trouble of stringing the washers on the nails as the latter are driven, but involves a considerable increase of expense in the cost of the nails themselves.

An important object of my present invention has been to combine the economy of the first-mentioned method with the time and labor saving advantages of the second, and to the attainment of this object I have produced the novel soft metal washer forming the subject-matter of the present invention, which is of such a character and structure that it can readily be strung on the nail by manual pressure, and when so applied will cling to the nail so that the workman on a job can first equip all of the nails required with washers, and can later handle them in the same manner as he handles nails which have been previously equipped with permanently applied soft metal washers. Another object of the invention is to provide a washer of such a structure that when the nail is driven home, the washer will efficiently seal both the neck and the head of the nail against the ingress of moisture by insuring a tight fit of the washer on the neck and head of the nail, and will also seal the nail hole in the sheathing.

Other objects and attendant advantages of the invention will be apparent to persons skilled in the art as the same becomes better understood by reference to the following detailed description, taken in connection with the accompanying drawing, wherein I have illustrated a practical and approved embodiment of the invention, and in which—

Fig. 1 is a plan view of my improved washer;

Fig. 2 is a diametric section of the same;

Fig. 3 is a view similar to Fig. 2, showing a nail piercing the diaphragm of the washer;

Fig. 4 is a view similar to Fig. 3, but showing the washer in its final position on the head and neck of the nail;

Fig. 5 is a sectional view showing a modified form of washer;

Fig. 6 is a sectional view showing the nail and washer of Fig. 5 applied to corrugated sheathing.

Referring to the drawing, my improved washer, which is preferably made of lead or other soft metal, comprises, in the preferred form thereof illustrated, a circular ring portion A, an intermediate web portion B countersunk on both sides of the ring portion A to provide a seat within the ring portion for the head H of the nail N, as illustrated in Fig. 4, and a central integral and imperforate diaphragm C in the web portion B. The diaphragm C is of such thinness that it may readily be pierced by the point P of the nail under manual pressure of the washer against the point of the nail or of the point of the nail against the washer, as illustrated in Fig. 3. This pressure being continued, the thin diaphragm C is completely ruptured as the body of the nail passes through the opening in the web B in which the diaphragm is located; and it will readily be understood that the depending ruptured portions C' of the diaphragm will cling frictionally to the body of the nail and prevent the washer from accidentally sliding off the latter. In the final position of the washer on the nail the head H of the latter completely fills the shallow recess in the top side of the washer, as shown in Fig. 4, and when the nail is driven home, the ruptured portions C' of the diaphragm are packed into the nail hole in the sheathing and at the same time forced tightly around the neck of the nail, thus providing an effective guard at this point against moisture working in through the nail hole. At the same time the lower side of the ring A acts as a sealing ring, covering the corresponding area of the metal sheet after the nail has been driven in place, the flexibility of the intermediate and relatively thin web portion B readily permitting the ring A to adjust itself under the blows of the hammer to a tight fit on the sheathing.

To facilitate the ready application of the washer to the nail by manual pressure, the thin central diaphragm may be formed with a small centering hole, such as is shown in Fig. 5 at D. In Figs. 5 and 6 I have also illustrated a slight modification in the intermediate web portion of the washer, wherein it will be seen that the web portion, identified by B', instead of being flat and of uniform thickness, is slightly bulged or thickened throughout its inner portion immediately surrounding the diaphragm. The principal advantage of this will be seen by reference to Fig. 6, wherein, as the nail is driven home, the intermediate swelled portion of the web is forced downwardly and packed tightly into the nail hole in the sheathing, thus forming an effective seal for the nail hole. This construction is particularly advantageous when employed on nails that are driven through the crowns of corrugated sheathing, such as is indicated at S in Fig. 6. Where, however, the nails are driven through flat sheathing, the form of washer shown in Figs. 1 to 4 inclusive is effective to seal the nail hole by reason of the contact of the under side of the ring portion with the surface of the sheathing.

It will be observed that the described washer is of identical formation on both sides, so that it may be applied to the nail either side up with equal efficiency.

The washer herein described is readily made between dies from a soft metal ball or sphere such as a buckshot, or from sheet metal of suitable thickness, or from short sections of wire; and when applied to the nail in the manner described clings to the latter with the same time and labor saving advantages as those pertaining to the lead-headed nails. At the same time it possesses the advantage of the ordinary loose washer in that it does not require any molding or machine operation for applying it to the nail.

I have herein shown and described simple and practical physical embodiments of the principle of the invention, but it should be understood that the latter is not limited to the exact structures shown, but may be variously modified within the purview and scope of the appended claims.

I claim—

1. A soft metal washer for nails formed with an integral substantially central diaphragm of such thinness as to be ruptured by the point of a nail under manual pressure.

2. A soft metal disc washer for nails formed with a central integral diaphragm located substantially midway between the faces of the washer and of such thinness as to be ruptured by the point of a nail under manual pressure.

3. A soft metal washer for nails formed with a central integral diaphragm located substantially midway between the faces of the washer, said diaphragm formed with a central aperture to center the point of a nail and of such thinness as to be ruptured by the latter under manual pressure.

4. A soft metal washer for nails, comprising an outer ring portion, an intermediate web portion countersunk to seat the head of a nail within said ring portion, and an integral diaphragm located centrally of said web portion and of such thinness as to be ruptured by the point of the nail under manual pressure.

5. A soft metal washer for nails, comprising an outer ring portion, an intermediate web portion countersunk on both sides of said ring portion to seat the head of a nail within the latter on either side of the washer, and an integral diaphragm located centrally of said web portion and countersunk on both sides of the latter, said diaphragm being of such thinness as to be ruptured by the point of the nail under manual pressure and when so ruptured acting to cling by friction to the body of the nail.

6. A soft metal washer for nails, comprising an outer ring portion, an intermediate web portion countersunk on both sides of said ring portion to seat the head of a nail and of increasing thickness from its periphery toward its center, and an integral diaphragm located centrally of said web portion and countersunk on both sides of the latter, said diaphragm being formed with an aperture to center the point of a nail and being of such thinness as to be ruptured by the latter under manual pressure.

EDWIN V. SWANGREN.